(12) United States Patent
Cha et al.

(10) Patent No.: US 11,049,659 B2
(45) Date of Patent: Jun. 29, 2021

(54) MULTILAYER CERAMIC ELECTRONIC COMPONENT AND METHOD FOR MANUFACTURING THE SAME

(71) Applicant: SAMSUNG ELECTRO-MECHANICS CO., LTD., Suwon-si (KR)

(72) Inventors: Kyoung Jin Cha, Suwon-si (KR); Seung Heui Lee, Suwon-si (KR); Beom Seock Oh, Suwon-si (KR); Kwang Sic Kim, Suwon-si (KR); Dong Hoon Kim, Suwon-si (KR); Jong Ho Lee, Suwon-si (KR); Seon Jae Mun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 10 days.

(21) Appl. No.: 16/281,417

(22) Filed: Feb. 21, 2019

(65) Prior Publication Data

US 2020/0013553 A1    Jan. 9, 2020

(30) Foreign Application Priority Data

Jul. 3, 2018    (KR) .......................... 10-2018-0076938

(51) Int. Cl.
*H01G 4/30*    (2006.01)
*H01G 4/012*    (2006.01)
(Continued)

(52) U.S. Cl.
CPC .............. *H01G 4/30* (2013.01); *H01G 4/012* (2013.01); *H01G 4/12* (2013.01); *H01G 4/228* (2013.01)

(58) Field of Classification Search
CPC .......... H01G 4/005; H01G 4/30; H01G 4/012; H01G 4/12; H01G 4/228
(Continued)

(56) References Cited

U.S. PATENT DOCUMENTS

2013/0027842 A1* 1/2013 Kim ..................... H01G 4/1209
361/321.2
2013/0286539 A1* 10/2013 Kim ...................... H01G 4/012
361/303
(Continued)

FOREIGN PATENT DOCUMENTS

JP    2004-079994 A    11/2004
JP    2008-078371 A    4/2008
(Continued)

OTHER PUBLICATIONS

Korean Office Action dated Jun. 19, 2019 issued in Korean Patent Application No. 10-2018-0076938 (with English translation).

*Primary Examiner* — Arun Ramaswamy
(74) *Attorney, Agent, or Firm* — Morgan, Lewis & Bockius LLP

(57) ABSTRACT

Provided are a multilayer ceramic electronic component and a method for manufacturing the same, the multilayer ceramic electronic component including a ceramic body including a dielectric layer and an internal electrode, and an external electrode formed on an outer side of the ceramic body and electrically connected to the internal electrode, wherein the internal electrode includes a conductive metal and an additive, and the number of particles of the additive disposed per $\mu m^2$ of the internal electrode is in the range of 7 to 21, both inclusive.

8 Claims, 3 Drawing Sheets

(51) Int. Cl.
*H01G 4/12* (2006.01)
*H01G 4/228* (2006.01)

(58) Field of Classification Search
USPC ............. 361/321.2, 303, 321.1, 321.3, 301.4
See application file for complete search history.

(56) References Cited

U.S. PATENT DOCUMENTS

2014/0240898 A1* 8/2014 Kim .................. H01G 4/30
  361/303
2018/0182549 A1* 6/2018 Koide ................ C04B 35/6264

FOREIGN PATENT DOCUMENTS

| JP | 2010-103198 A | | 6/2010 |
|---|---|---|---|
| JP | 2014-232850 A | | 11/2014 |
| JP | 2017120871 A | * | 7/2017 |
| KR | 10-2017-0077542 A | | 7/2017 |

* cited by examiner

I-I'

MULTILAYER CERAMIC ELECTRONIC COMPONENT AND METHOD FOR MANUFACTURING THE SAME

CROSS-REFERENCE TO RELATED APPLICATIONS

This application claims the benefit of priority to Korean Patent Application No. 10-2018-0076938 filed on Jul. 3, 2018 in the Korean Intellectual Property Office, the disclosure of which is incorporated herein by reference in its entirety.

TECHNICAL FIELD

The present disclosure relates to a multilayer ceramic electronic component and a method for manufacturing the same, and more particularly, to a multilayer ceramic electronic component having excellent reliability and a method for manufacturing the same.

BACKGROUND

Generally, electronic components using a ceramic material, such as a capacitor, an inductor, a piezoelectric element, a varistor, a thermistor, or the like, include a ceramic body made of a ceramic material, internal electrodes formed inside the ceramic body, and external electrodes installed on surfaces of the ceramic body so as to be connected to the internal electrodes.

Among multilayer ceramic electronic components, a multilayer ceramic capacitor includes a plurality of layered dielectric layers, internal electrodes disposed to face each other with one dielectric layer interposed therebetween, and external electrodes electrically connected to the internal electrodes.

Multilayer ceramic capacitors have been widely used as components in mobile communications devices such as laptop computers, personal digital assistants (PDAs), mobile phones, and the like, due to their advantages such as a compact size, high capacitance, ease of mounting, and the like.

In line with the recent trend in electrical and electronics industries for electronic devices having high performance as well as compact and slim forms, there has been demand for electronic components having a compact size, high performance, and ultra-high capacitance.

In particular, as the multilayer ceramic capacitors are being provided with increasingly higher capacitance and more compact sizes, a technique for maximizing capacitance per unit volume may be necessary.

Accordingly, in case of an internal electrode, high capacitance may be achieved through increasing the number of layers by maximizing the area thereof while minimizing the volume thereof.

However, as the internal electrode becomes thinner, the ratio of thickness to area decreases, thereby increasing sintering driving force, so breaking and clumping issues of the electrode may worsen.

Accordingly, to realize such high-capacitance multilayer ceramic capacitors, there may be provided a method for realizing a compact, high-capacitance multilayer ceramic capacitor with high reliability through controlling the breaking and clumping issues of the electrode, which are undesirable when forming a thin-layer internal electrode.

SUMMARY

An aspect of the present disclosure is to provide a multilayer ceramic electronic component and a method for manufacturing the same, and more particularly, a multilayer ceramic electronic component having excellent reliability and a method for manufacturing the same.

According to an aspect of the present disclosure, a multilayer ceramic electronic component includes a ceramic body including a dielectric layer and an internal electrode, and an external electrode formed on an outer side of the ceramic body and electrically connected to the internal electrode, wherein the internal electrode includes a conductive metal and an additive, and the number of particles of the additive disposed inside the internal electrode is in the range of 7 to 21, both inclusive, per $\mu m^2$ of the internal electrode.

According to another aspect of the present disclosure, a method for manufacturing a multilayer ceramic electronic component includes preparing a ceramic green sheet, forming an internal electrode pattern by a conductive paste containing a conductive metal and an additive, layering the ceramic green sheet having the internal electrode pattern formed thereon to form a ceramic laminate, and sintering the ceramic laminate to form a ceramic body including a dielectric layer and an internal electrode, wherein the number of particles of the additive disposed inside the internal electrode is in the range of 7 to 21, both inclusive, per $\mu m^2$ of the internal electrode.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
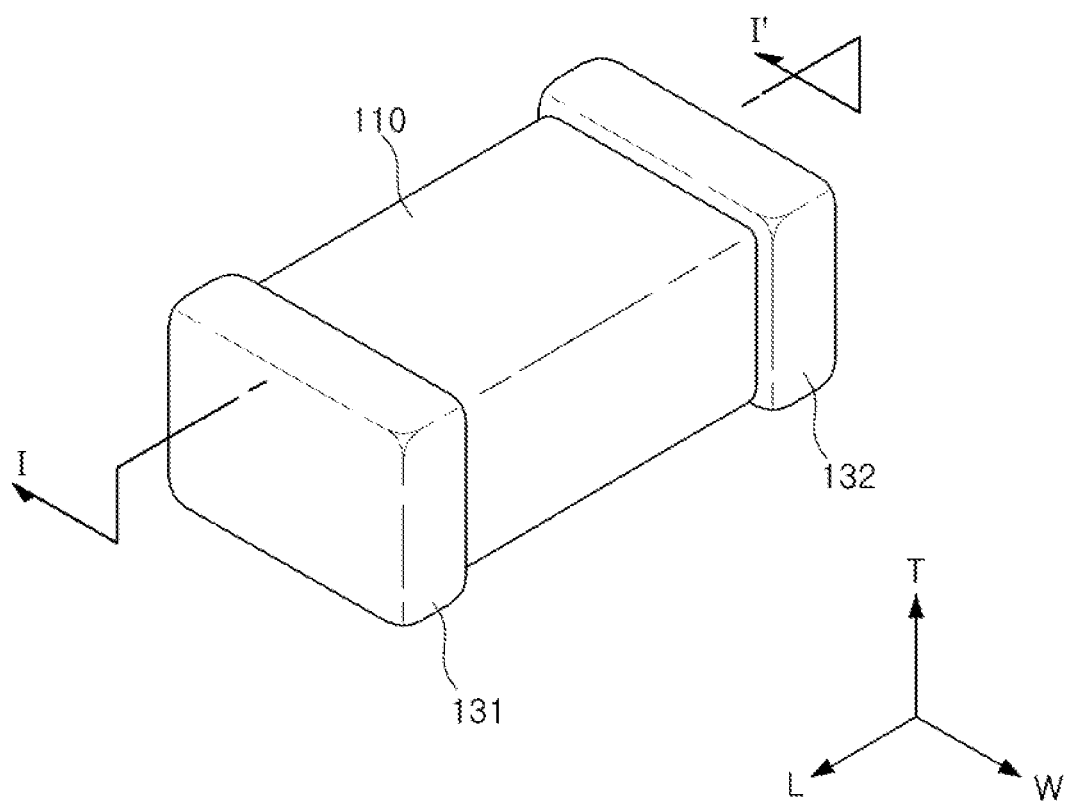
FIG. 1 is a schematic perspective view of a multilayer ceramic capacitor according to an exemplary embodiment in the present disclosure.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

An exemplary embodiment in the present disclosure relates to a ceramic electronic component. Examples of the electronic components using a ceramic material may include a capacitor, an inductor, a piezoelectric element, a varistor, a thermistor, and the like. Hereinafter, a multilayer ceramic capacitor as an example of the ceramic electronic component will be described.

FIG. 1 is a schematic perspective view illustrating a multilayer ceramic capacitor according to an exemplary embodiment in the present disclosure.

Figure 2:
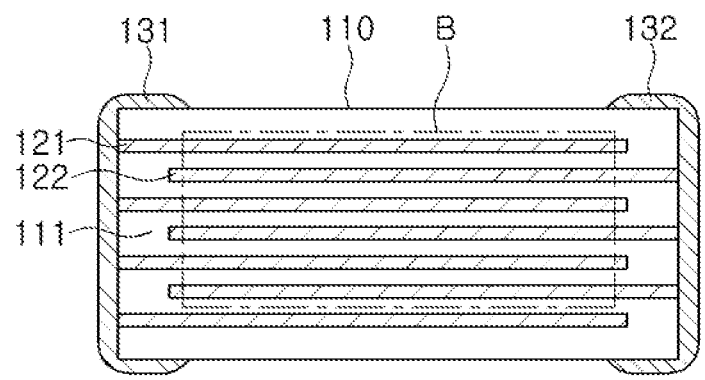
FIG. 2 is a schematic cross-sectional view of a multilayer ceramic capacitor according to the exemplary embodiment, taken along line I-I' in FIG. 1.

FIG. 2 is a schematic cross-sectional view illustrating a multilayer ceramic capacitor according to the exemplary embodiment, taken along line I-I' shown in FIG. 1.

Figure 3:
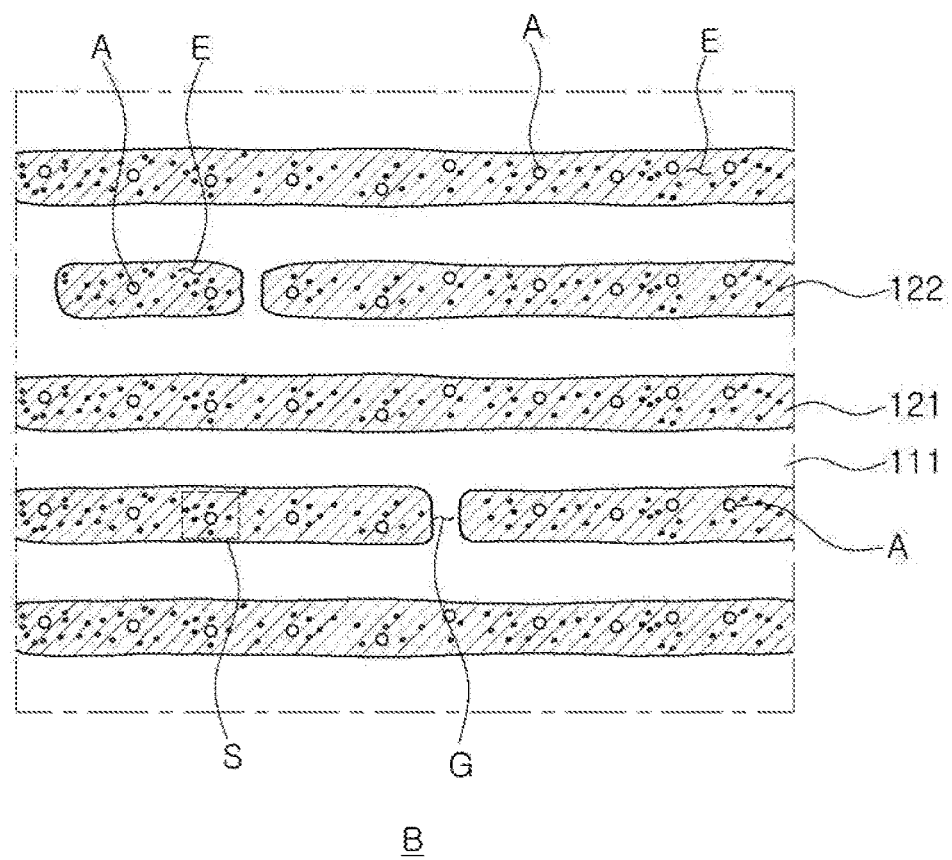
FIG. 3 is an enlarged view of region B in FIG. 2.

FIG. 3 is an enlarged view of region B shown in FIG. 2.

Figure 4:
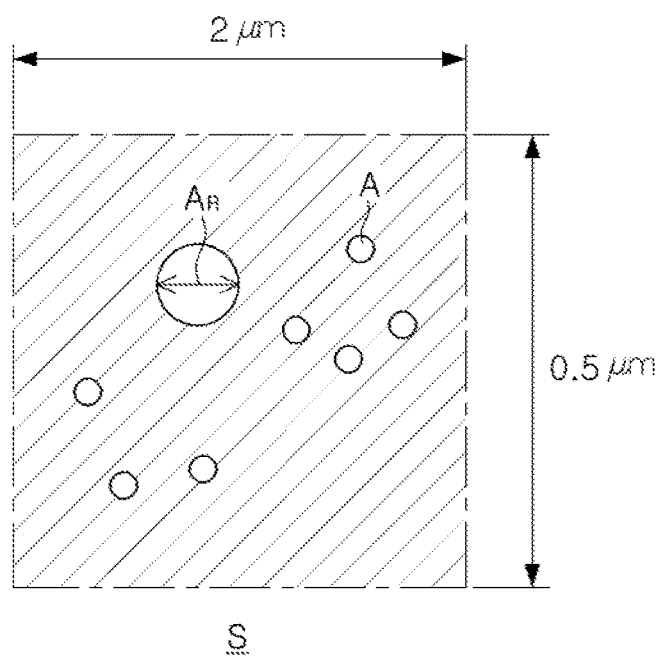
FIG. 4 is an enlarged view of region S in FIG. 3.

FIG. 4 is an enlarged view of region S shown in FIG. 3.

Referring to FIG. 1 and FIG. 2, the multilayer ceramic capacitor according to an exemplary embodiment may include a ceramic body 110, internal electrodes 121 and 122 formed inside the ceramic body 110, and external electrodes 131 and 132 disposed on an outer side of the ceramic body 110.

In the exemplary embodiment, the multilayer ceramic capacitor, a 'length direction' of the multilayer ceramic capacitor refers to an 'L' direction of FIG. 1, a 'width direction' of the multilayer ceramic capacitor refers to a 'W' direction of FIG. 1, and a 'thickness direction' of the multilayer ceramic capacitor refers to a 'T' direction of FIG. 1.

A shape of the ceramic body 110 is not limited to any particular shape, but may be a hexahedral shape according to the exemplary embodiment.

The ceramic body 110 may be formed by layering a plurality of dielectric layers 111.

The plurality of dielectric layers 111 forming the ceramic body 110 are in a sintered state, and adjacent dielectric layers 111 may be integrated with each other such that boundaries therebetween are not readily apparent.

The dielectric layer 111 may be formed by sintering a ceramic green sheet containing a ceramic powder.

The ceramic powder is not particularly limited, and may be any ceramic powder that is generally used in the related art.

The ceramic powder may include, for example, a $BaTiO_3$-based ceramic powder, but is not limited thereto.

An example of the $BaTiO_3$-based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like, is partially solid-solved in $BaTiO_3$, but is not limited thereto.

In addition, the ceramic green sheet may include a transition metal, rare earth elements, magnesium (Mg), aluminum (Al), or the like, together with the ceramic powder.

A thickness of a single dielectric layer 111 may be appropriately modified in accordance with a capacitance design of the multilayer ceramic capacitor.

A thickness of the dielectric layer 111 formed between two adjacent internal electrode layers after being sintered may be, for example, 0.6 μm or less, but is not limited thereto.

According to an exemplary embodiment in the present disclosure, the thickness of the dielectric layers 111 may refer to an average thickness.

The average thickness of the dielectric layers 111 may be measured by an image, captured by a scanning electron microscope (SEM), of a cross section of the ceramic body 110 in the length direction, as illustrated in FIG. 2.

For example, with respect to any dielectric layer extracted from an image, captured by the scanning electron microscope (SEM), of a cross section of the ceramic body 110 cut in a length and thickness L-T direction in a central portion of the ceramic body 110 in the width W direction, as illustrated in FIG. 2, thicknesses of the dielectric layer may be measured at thirty points equally spaced apart in the length direction, to measure an average value thereof.

The equally-spaced apart thirty points may be measured in a capacitance forming portion which refers to a region in which the internal electrodes 121 and 122 overlap each other.

In addition, when an average thickness of ten or more dielectric layers is measured, the average thickness of the dielectric layers may be further generalized.

The internal electrodes 121 and 122 may be disposed inside the ceramic body 110.

The internal electrodes 121 and 122 may be layered on a ceramic green sheet, and may be formed by sintering, inside the ceramic body 110 with one dielectric layer interposed therebetween.

The internal electrodes 121 and 122 may be a pair including a first internal electrode 121 and a second internal electrode 122, having different polarities to each other, and the first and second internal electrodes 121 and 122 may face each other in a layering direction of dielectric layers.

As illustrated in FIG. 2, one ends of the first and second internal electrodes 121 and 122 may be alternately exposed to one surface of the ceramic body 110 in the length direction.

Although not illustrated, according to an exemplary embodiment of the present disclosure, the first and second internal electrodes may include lead portions, and may be exposed to the same surface of the ceramic body through the lead portions. Alternatively, the first and second internal electrodes may have lead portions, and may be exposed to one or more surfaces of the ceramic body through the lead portions.

The thickness of one of the internal electrodes 121 and 122 is not limited to any particular value, but for example, may be 500 nm or less.

Alternatively, the thickness of one of the internal electrodes 121 and 122 may be in the range of 100 to 500 nm. Alternatively, the thickness of one of the internal electrodes 121 and 122 may be in the range of 300 to 500 nm.

According to the exemplary embodiment, the dielectric layers having internal electrodes therein may be layered in 200 layers or more, which will be described in detail below.

According to an exemplary embodiment, a characteristic configuration is provided to suppress breaking and clumping issues of electrodes, which may occur due to thin-layer internal electrodes and when a thickness of one of the internal electrodes 121 and 122 is 500 nm or less. However, when a thickness of one of the internal electrodes 121 and 122 exceeds 500 nm, reliability may not deteriorate even without using the characteristic configuration in the present disclosure.

The characteristic configuration in the present disclosure described below may be applied to improve reliability when a thickness of one of the internal electrodes 121 and 122 is 500 nm or less.

According to an exemplary embodiment, external electrodes 131 and 132 may be formed on an outer side of the ceramic body 110, and the external electrodes 131 and 132 may be electrically connected to the internal electrodes 121 and 122.

In particular, the external electrodes 131 and 132 may include a first external electrode 131 electrically connected to the first internal electrode 121 exposed to one surface of the ceramic body 110, and a second external electrode 132 electrically connected to the second internal electrode 122 exposed to the other surface of the ceramic body 110.

Although not illustrated, a plurality of external electrodes may be formed to be connected to the first and second internal electrodes exposed to the ceramic body.

The external electrodes 131 and 132 may be formed by a conductive paste containing a metal powder.

The metal powder contained in the conductive paste is not particularly limited, and may include, for example, nickel (Ni), copper (Cu), or alloys thereof.

A thickness of each of the external electrodes 131 and 132 may be appropriately determined, and may be about 10-50 μm, for example.

Referring to FIG. 3 and FIG. 4, the internal electrodes 121 and 122 contain a conductive metal and an additive A, and the number of particles of the additive A disposed inside the internal electrodes 121 and 122 is in the range of 7 to 20, both inclusive, per unit area, for example, per $\mu m^2$, of the internal electrode.

The internal electrodes 121 and 122 include a conductive metal and an additive A for suppressing the internal electrodes from shrinking when sintering.

The additive (A) is not limited to any particular material as long as it can suppress the internal electrodes from shrinking when sintering, and for example, may be at least one of a non-metal material and a metal oxide.

The non-metal material and the metal oxide may include, for example, barium titanate ($BaTiO_3$), $ZrO_2$, $Al_2O_3$, TiN, SiN, AlN, TiC, SiC, WC, or the like, but are not limited thereto.

Conventionally, a non-metal material and a metal oxide were contained in internal electrodes to suppress shrinkage of the internal electrodes.

However, according to the exemplary embodiment in the present disclosure, by trapping the non-metal material and the metal oxide, which is the additive A, inside the internal electrodes 121 and 122, and by controlling the number of particles of the additive trapped therein, it is possible to realize a multilayer ceramic electronic component capable of eliminating the clumping and breaking issues of internal electrodes, having a high capacitance without a decrease in electrode connectivity, and having excellent reliability.

Particularly, according to the exemplary embodiment, the number of particles of the additive A disposed in the internal electrodes 121 and 122 may be in the range of 7 to 21, both inclusive, per unit area, for example, per $\mu m^2$, of the internal electrode.

By controlling the number of particles of the additive A disposed inside the internal electrodes 121 and 122 to be in the range of 7 to 21, both inclusive, per unit area, for example, per $\mu m^2$, of the internal electrode, it is possible to control growth rate and migration of grain boundaries of the internal electrode at middle and late stages of a sintering process of the internal electrode, unlike the conventional means in the related art. Thus, the breaking and clumping issues of internal electrodes may be more effectively addressed than in the related art.

If the number of particles of the additive A disposed is less than 7 per unit area, for example, per $\mu m^2$, of the internal electrode, connectivity of the internal electrode may be less than 80%, and thus, a high-capacitance multilayer ceramic capacitor cannot be realized.

When the number of particles of the additive A disposed exceeds 21 per unit area, for example, per $\mu m^2$, of the internal electrode, the thickness of the internal electrode cannot be controlled to be 500 nm or less, so the internal electrodes of a multilayer ceramic capacitor cannot be formed as thin layers.

According to the exemplary embodiment, the number of particles of the additive A disposed inside the entire internal electrodes 121 and 122 may be in the range of 7 to 21, both inclusive, per unit area, for example, per $\mu m^2$, of the internal electrode.

In the related art, the additive may be trapped inside the internal electrodes, and the number of particles of the additive measured at a specific region inside the internal electrodes may be in the range of 7 to 21, both inclusive, per unit area, for example, per $\mu m^2$, of the internal electrode. However, in the related art, the additive was not disposed throughout the entire internal electrodes 121 and 122 as shown in the exemplary embodiment of the present disclosure.

According to the exemplary embodiment, by coating a conductive metal with a particulate additive, or by controlling an initial sintering process, the number of particles of the additive A per unit area, for example, per $\mu m^2$, of the internal electrode, disposed inside the internal electrodes 121 and 122, may be in the range of 7 to 21, both inclusive, and the additive A may be disposed uniformly in the above range throughout the respective unit area of the entire internal electrodes 121 and 122.

Referring to FIG. 4, a particle size $A_R$ of the additive A may be in the range of 5 to 200 nm, both exclusive.

In the exemplary embodiment, the particle size $A_R$ of the additive may use a particulate additive of 5 to 200 nm, both exclusive, so the number of particles of the additive A disposed inside the internal electrodes 121 and 122 may be in the range of 7 to 21, both inclusive, per unit area, for example, per $\mu m^2$, of the internal electrode.

Particularly, the particle size $A_R$ of the additive A, may use the particulate additive of 5 to 200 nm, both exclusive, and thus, it may be possible to realize a multilayer ceramic electronic component capable of eliminating the clumping and breaking issues of electrodes, having a high capacitance without a decrease in electrode connectivity, and having excellent reliability.

If the particle size $A_R$ of the additive A is 5 nm or less, the particle size of the additive may be too small to be effective in controlling sintering, so the clumping and breaking issues of electrodes cannot be eliminated.

If the particle size $A_R$ of the additive A is 200 nm or more, the particle size of the additive may be excessively large with respect to the thickness of an electrode, so that the electrode portion is reduced, a high-capacitance multilayer ceramic capacitor cannot be realized.

Figure 5:
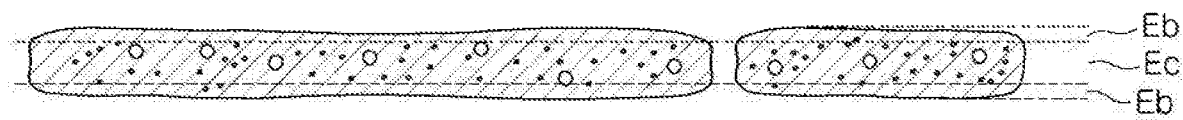
FIG. 5 is an enlarged view illustrating one internal electrode shown in FIG. 3.

FIG. 5 is an enlarged view illustrating one of internal electrodes shown in FIG. 3.

Referring FIG. 5, the additive A may be more densely disposed in a central portion Ec of one of the internal electrodes 121 and 122 than in upper and lower boundary portions Eb thereof.

Particularly, the additive A may be controlled so as to be more densely disposed in the central portion Ec of one of the internal electrodes 121 and 122 than in the upper and lower boundary portions Eb thereof to suppress the electrodes from shrinking, thereby addressing the clumping and breaking issues of the electrodes.

Also, by having the additive A controlled to be more densely disposed in the central portion Ec of one of the internal electrodes 121 and 122 than in the upper and lower boundary portions Eb thereof, capacitance may not suffer a decrease as electrode connectivity is not decreased, and since clumping of the electrodes does not occur, withstand voltage properties may be satisfied, thereby improving reliability.

Figure 6:
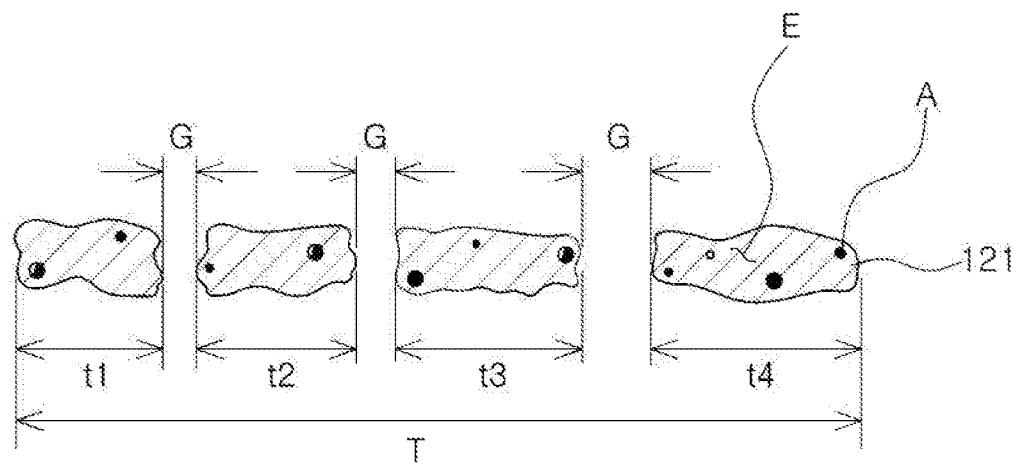
FIG. 6 is a schematic diagram illustrating connectivity of an internal electrode.

FIG. 6 is a schematic diagram illustrating connectivity of an internal electrode.

According to the exemplary embodiment, connectivity of the internal electrode, defined as a ratio of a length of a portion of the internal electrode in which the internal electrode is actually formed to the entire length of the respective internal electrode 121 or 122 in a cross-sectional view in a length-thickness plane, may be 80% or more.

According to the exemplary embodiment, connectivity of the internal electrode may be defined as a ratio of the length of a portion of the internal electrode in which the internal electrode is actually formed, to the entire length of the internal electrode (the length of a portion of the internal electrode in which the internal electrode is actually formed/the entire length of the internal electrode), in the cross-sectional view in a length-thickness plane.

Referring to FIG. 6, the entire length of the internal electrode and the length of a portion of the internal electrode in which the internal electrode is actually formed may be measured by using an optical image of a cross section of a multilayer ceramic capacitor as shown in FIG. 6.

Particularly, a ratio of the length of a portion of the internal electrode in which the internal electrode is actually formed to the entire length of the internal electrode may be measured from an image of a length-thickness cross section of the ceramic body cut in a length direction in the central portion of the ceramic body in the width direction.

More particularly, when T is defined as the entire length of the internal electrode 121 including pores at certain points of the internal electrode 121, and $t1, t2, t3, \ldots tn$ are defined as lengths of portions of the internal electrode 121 in which the internal electrode 121 is actually formed, connectivity of the internal electrode 121 may be expressed as $(t1+t2+t3+\ldots+tn)/T$. Although the portions of the internal electrode 121 in which the internal electrode 121 is actually formed are expressed as t1, t2, t3, and t4, the number of such portions is not limited thereto.

The length of a portion of the internal electrode 121 in which the internal electrode 121 is actually formed, may be calculated as a value by subtracting lengths of gaps G from the entire length T of the internal electrode 121.

According to another exemplary embodiment in the present disclosure, a method for manufacturing a multilayer ceramic electronic component includes preparing a ceramic green sheet, forming an internal electrode pattern by a conductive paste containing a conductive metal and an additive, layering the ceramic green sheet having the internal electrode pattern formed thereon to form a ceramic laminate, and sintering the ceramic laminate to form a ceramic body including a dielectric layer and an internal electrode, wherein the number of particles of the additive disposed inside the internal electrode is in the range of 7 to 21, both inclusive, per unit area, for example, per $\mu m^2$, of the internal electrode.

Hereinbelow, a method for manufacturing a multilayer ceramic capacitor according to another exemplary embodiment will be described.

According to an exemplary embodiment in the present disclosure, a plurality of ceramic green sheets may be prepared. The ceramic green sheet may be manufactured by mixing a ceramic powder, a binder, a solvent, and the like, with one another to prepare a slurry and producing the slurry in a sheet shape having a thickness of several micrometers by a doctor blade method. Then, the ceramic green sheet may be sintered to form one dielectric layer 111 as illustrated in FIG. 2.

Then, a conductive paste for an internal electrode may be applied to the ceramic green sheet to form internal electrode patterns. The internal electrode patterns may be formed by a screen printing method or a gravure printing method.

The conductive paste for an internal electrode may include a conductive metal and an additive. The additive may be one or more of a non-metal material or a metal oxide.

The conductive metal may include nickel. The additive may include barium titanate or strontium titanate as the metal oxide.

Then, the ceramic green sheets having the internal electrode patterns formed thereon may be layered and compressed by being pressed in a layered direction. Therefore, a ceramic laminate having the internal electrode patterns formed therein may be manufactured.

Then, the ceramic laminate may be cut per region corresponding to one capacitor to be manufactured in a chip form.

In this case, the ceramic laminate may be cut so that one ends of the internal electrode patterns are alternately exposed through side surfaces.

Then, the laminate manufactured in the chip form may be sintered to form the ceramic body.

The sintering process may be performed in a reducing atmosphere. In addition, the sintering process may be performed while controlling a temperature raising rate. The temperature raising rate may be 30° C./60 s to 50° C./60 s at 700° C. or less.

According to an exemplary embodiment, the additive may be trapped inside the internal electrode, and by incorporating in the paste for an internal electrode, a particulate additive having a particle size of 5 to 200 nm, both exclusive, and by coating a conductive metal with the particulate additive or controlling the initial sintering process, it is possible to control the number of particles of the additive disposed to be in the range of 7 to 21, both inclusive, per unit area, for example, per $\mu m^2$, of the internal electrode. Accordingly, a multilayer ceramic electronic component capable of eliminating the clumping and breaking issues of electrodes, having a high capacitance without a decrease in electrode connectivity, and having excellent reliability, may be realized.

Particularly, a method for coating the conductive metal with the particulate additive may be performed by uniformly dispersing the particulate additive and the conductive metal and performing a thermal treatment, or by adding a raw material of the additive to the surface of the conductive metal in a slurry state and conducting a chemical reaction.

In addition, a method of trapping the particulate additive inside the internal electrode by controlling an initial sintering process may be performed by a method of controlling the sintering of a conductive metal through controlling a sintering temperature profile, a method of controlling the particle size and particle size distribution of a conductive metal, or a method of controlling the sintering of a conductive metal through controlling the surface characteristics of the conductive metal.

Then, the external electrodes may be formed to cover side surfaces of the ceramic body and to be electrically connected to the internal electrodes exposed to the side surfaces of the ceramic body. Then, plated layers formed of nickel, tin, or the like, may be formed on surfaces of the external electrodes.

Hereinbelow, the present disclosure will be described with reference to Examples and Comparative Examples.

Multilayer ceramic capacitors according to Examples and multilayer ceramic capacitors according to Comparative Examples were prepared by the following method.

Barium titanate powder, ethanol as an organic solvent, and polyvinyl butyral as a binder were mixed with one another and were ball-milled to prepare ceramic slurry. Then, a ceramic green sheet was manufactured using the ceramic slurry.

A conductive paste for an internal electrode containing nickel was printed on the ceramic green sheets to form the internal electrodes, and a green laminate formed by layering the ceramic green sheets was isostatically pressed at 85° C. and at a pressure of 1,000 kgf/cm^2.

The pressed green laminate was cut to produce a green chip, a de-binder process for maintaining the cut green ship at 230° C. under an atmospheric condition for 60 hours was performed, and the green chip was sintered at 1,000° C. to produce a sintered chip. The sintering was performed in a reducing atmosphere to prevent oxidation of the internal electrodes, and the reducing atmosphere was $10^{-11}$ to $10^{-10}$ atm, which was lower than Ni/NiO equilibrium oxygen partial pressure.

External electrodes were formed on external surfaces of the sintered chip using a paste for an external electrode containing copper powder and glass powder, a nickel-plated layer and a tin-plated layer were formed on the external electrode through electroplating.

A multilayer ceramic capacitor having a 0603 size was manufactured by the abovementioned method. The 0603 size may have a length and a width of 0.6 μm±0.1 μm and 0.3 μm±0.1 μm, respectively. Features of the multilayer ceramic capacitor were evaluated as follows.

In Table 1, electrode connectivity, electrode thickness reduction effects, and decisions based thereon are compared on the basis of the number of particles of the additive disposed per unit area, for example, per $\mu m^2$, of the internal electrode according to the exemplary embodiment in the present disclosure.

TABLE 1

| | Number of Particles of Additive per Unit Area (ea/μm²) | Electrode Connectivity (%) | Electrode Thickness Reduction Effects | Decisions |
|---|---|---|---|---|
| 1* | 3 or less | 70 or less | X | X |
| 2* | 5 | 75 | ○ | ○ |
| 3 | 7 | 80 | ◉ | ◉ |
| 4 | 9 | 82 | ◉ | ◉ |
| 5 | 11 | 84 | ◉ | ◉ |
| 6 | 13 | 85 | ◉ | ◉ |
| 7 | 15 | 86 | ◉ | ◉ |
| 8 | 17 | 87 | ◉ | ◉ |
| 9 | 19 | 88 | ◉ | ◉ |
| 10 | 21 | 89 | ◉ | ◉ |
| 11* | 23 | 89 | ○ | ○ |
| 12* | 25 or more | 89 | X | X |

[Evaluations]
X: Unacceptable,
○: Acceptable,
◉: Good
*Comparative Examples

Referring to Table 1, in Samples 1 and 2, where the number of particles of the additive A is less than 7 per unit area, for example, per 1 μm², of the internal electrode, connectivity of the internal electrode became less than 80%, so a high-capacitance multilayer ceramic capacitor could not be realized.

In Samples 11 and 12, where the number of particles of the additive A exceeds 21 per unit area, for example, per 1 μm², of the internal electrode, the thickness of the internal electrode could not be controlled to 500 nm or less, so the internal electrode of the multilayer ceramic capacitor could not be made as a thin layer.

In Samples 3 and 10, where the conditions in the present disclosure were satisfied, a high-capacitance multilayer ceramic capacitor having connectivity of the internal electrode of 80% or higher, excellent electrode thickness reduction effects, and excellent reliability could be achieved.

Table 2 shows capacitance per body thickness in relation to an average particle size of the trapped additive according to the exemplary embodiment in the present disclosure, and decisions made based thereon.

Capacitance evaluations and decisions made based thereon were each determined to be acceptable (○) if the target desired capacitance is met by 98.5% or more, and unacceptable (x) if the target desired capacitance is met by less than 98.5%.

TABLE 2

| | Average Particle Size of Trapped Additive A (nm) | Capacitance per Body Thickness | Decisions |
|---|---|---|---|
| 1* | 5 or less | X | X |
| 2 | 10 | ○ | ○ |
| 3 | 80 | ○ | ○ |
| 4 | 100 | ○ | ○ |
| 5 | 140 | ○ | ○ |
| 6 | 180 | ○ | ○ |
| 7 | 200 | ○ | ○ |
| 8* | 200 or more | X | X |

*Comparative Examples

In Sample 1, where the particle size $A_R$ of the additive A is 5 nm or less, the particle size of the additive was too small to be effective in controlling sintering, thus failing to eliminate the clumping and breaking issues of the electrode.

In Sample 8, where the particle size $A_R$ of the additive A is 200 nm or more, the particle size was excessively large with respect to the thickness of the electrode, so the electrode portion was reduced, thus failing to realize a high-capacitance multilayer ceramic capacitor.

Alternatively, in Samples 2 to 7, where the conditions in the present disclosure were satisfied, multilayer ceramic electronic components capable of eliminating the clumping and breaking issues of the electrode, having high capacitance without a decrease in electrode connectivity, and having excellent reliability could be realized.

As set forth above, according to an exemplary embodiment in the present disclosure, by trapping an additive in the form of a non-metal material or a metal oxide inside an internal electrode and thereby controlling growth rate and migration of grain boundaries of the electrode, a multilayer ceramic capacitor having excellent reliability may be realized.

Further, the additive in the form of a non-metal material or a metal oxide may be trapped inside the internal electrode by coating a conductive metal with a particulate additive or controlling an initial sintering process, and further by controlling the number of particles of the additive, it may be possible to realize a multilayer ceramic electronic component capable of eliminating the clumping and breaking issues of the electrode, having a high capacitance without a decrease in electrode connectivity, and having excellent reliability.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic body including a dielectric layer and an internal electrode; and
an external electrode formed on an outer side of the ceramic body and connected to the internal electrode,
wherein the internal electrode contains a conductive metal and an additive, and the number of particles of the additive disposed inside the internal electrode is in the range of 7 to 21, both inclusive, per m² of the internal electrode,
a thickness of the internal electrode is 500 nm or less,
the internal electrode has connectivity of 80% or more and 89% or less, where the connectivity of the internal electrode is defined as a ratio of a length of a portion of the internal electrode in which the internal electrode is actually formed to the entire length of the internal electrode, and
wherein the additive is disposed more densely in a central portion than in a boundary portion of the internal electrode.

2. The multilayer ceramic electronic component of claim 1, wherein a particle size of the additive is in the range of 5 to 200 nm, both exclusive.

3. The multilayer ceramic electronic component of claim 1, wherein the number of particles of the additive per µm² inside the internal electrode is in the range of 7 to 21, both inclusive, throughout the entire internal electrode.

4. The multilayer ceramic electronic component of claim 1, wherein the additive is at least one of a non-metal material and a metal oxide.

5. A method for manufacturing a multilayer ceramic electronic component, the method comprising:
preparing a ceramic green sheet; forming an internal electrode pattern by a conductive paste containing a conductive metal and an additive;
layering the ceramic green sheet having the internal electrode pattern formed thereon to form a ceramic laminate; and,
sintering the ceramic laminate to form a ceramic body including a dielectric layer and an internal electrode, wherein the number of particles of the additive disposed inside the internal electrode is in the range of 7 to 21, both inclusive, per m² of the internal electrode,
a thickness of the internal electrode is 500 nm or less,
the internal electrode has connectivity of 80% or more and 89% or less, where the connectivity of the internal electrode is defined as a ratio of a length of a portion of the internal electrode in which the internal electrode is actually formed to the entire length of the internal electrode, and
wherein the additive is more densely disposed in a central portion than in a boundary portion of the internal electrode.

6. The method for manufacturing a multilayer ceramic electronic component of claim 5, wherein the conductive metal, while having the additive coated on a surface thereof, is included in a conductive paste.

7. The method for manufacturing a multilayer ceramic electronic component of claim 5, wherein a particle size of the additive disposed inside the internal electrode after the sintering is in the range of 5 to 200 nm, both exclusive.

8. The method for manufacturing a multilayer ceramic electronic component of claim 5, wherein the number of particles of the additive disposed per µm² of the internal electrode is in the range of 7 to 21, both inclusive, throughout the entire internal electrode.

* * * * *

UNITED STATES PATENT AND TRADEMARK OFFICE
CERTIFICATE OF CORRECTION

PATENT NO. : 11,049,659 B2
APPLICATION NO. : 16/281417
DATED : June 29, 2021
INVENTOR(S) : Kyoung Jin Cha It is certified that error appears in the above-identified patent and that said Letters Patent is hereby corrected as shown below:

In the Claims

Column 11, Lines 2 through 22 should read:
--1. A multilayer ceramic electronic component comprising:
    a ceramic body including a dielectric layer and an internal electrode; and
    an external electrode formed on an outer side of the ceramic body and connected to the internal electrode, wherein the internal electrode contains a conductive metal and an additive, and the number of particles of the additive disposed inside the internal electrode is in the range of 7 to 21, both inclusive, per $\mu m^2$ of the internal electrode,
    a thickness of the internal electrode is 500 nm or less,
    the internal electrode has connectivity of 80% or more and 89% or less, where the connectivity of the internal electrode is defined as a ratio of a length of a portion of the internal electrode in which the internal electrode is actually formed to the entire length of the internal electrode, and
    wherein the additive is disposed more densely in a central portion than in a boundary portion of the internal electrode.--

Column 11, Line 33 through Column 12, Line 20 should read:
--5. A method for manufacturing a multilayer ceramic electronic component, the method comprising:
    preparing a ceramic green sheet;
    forming an internal electrode pattern by a conductive paste containing a conductive metal and an additive;
    layering the ceramic green sheet having the internal electrode pattern formed thereon to form a ceramic laminate; and,
    sintering the ceramic laminate to form a ceramic body including a dielectric layer and an internal electrode, wherein the number of particles of the additive disposed inside the internal electrode is in the range of 7 to 21, both inclusive, per $\mu m^2$ of the internal electrode,
    a thickness of the internal electrode is 500 nm or less,
    the internal electrode has connectivity of 80% or more and 89% or less, where the connectivity of the internal electrode is defined as a ratio of a length of a portion of the internal Signed and Sealed this
Seventeenth Day of May, 2022

*Katherine Kelly Vidal*
*Director of the United States Patent and Trademark Office* electrode in which the internal electrode is actually formed to the entire length of the internal electrode, and wherein the additive is more densely disposed in a central portion than in a boundary portion of the internal electrode.--